United States Patent [19]
Tiller

[11] 3,960,112

[45] June 1, 1976

[54] BIRD FEEDER

[76] Inventor: Boyce C. Tiller, Blackbeard Harbor, Coles Point, Va. 22442

[22] Filed: Sept. 16, 1974

[21] Appl. No.: 506,018

[52] U.S. Cl. ............................................. 119/51 R
[51] Int. Cl.² ........................................... A01K 5/00
[58] Field of Search ............... 119/51 R, 61, 63, 23, 119/52 R, 24, 26

[56] References Cited
UNITED STATES PATENTS

| | | | |
|---|---|---|---|
| 2,077,208 | 4/1937 | Brady | 119/24 |
| 2,681,038 | 6/1954 | Clark | 119/23 |
| 3,017,858 | 1/1962 | Brown | 119/61 |
| 3,049,093 | 8/1962 | Oliver | 119/51 R |
| 3,104,649 | 9/1963 | Slaven | 119/63 |
| 3,191,579 | 6/1965 | Oliver | 119/51 R |
| 3,230,932 | 1/1966 | Etnyre | 119/51 R |
| 3,505,975 | 4/1970 | Spencer | 119/23 |
| 3,566,842 | 3/1971 | Oldaker | 119/23 |
| 3,568,641 | 3/1969 | Kilham | 119/51 R |
| D103,963 | 4/1937 | Butler | 119/24 |

FOREIGN PATENTS OR APPLICATIONS 118,245    2/1947    Sweden ............................ 119/23

*Primary Examiner*—Hugh R. Chamblee
*Assistant Examiner*—James D. Hamilton
*Attorney, Agent, or Firm*—Griffin, Branigan and Butler

[57] ABSTRACT

A bird feeder which includes removable bird feed containers supported in a cylindrical member which is suspended by a strap. The container includes an orifice of a size to permit only small birds to enter the feeder, while larger birds are required to feed from outside.

2 Claims, 5 Drawing Figures

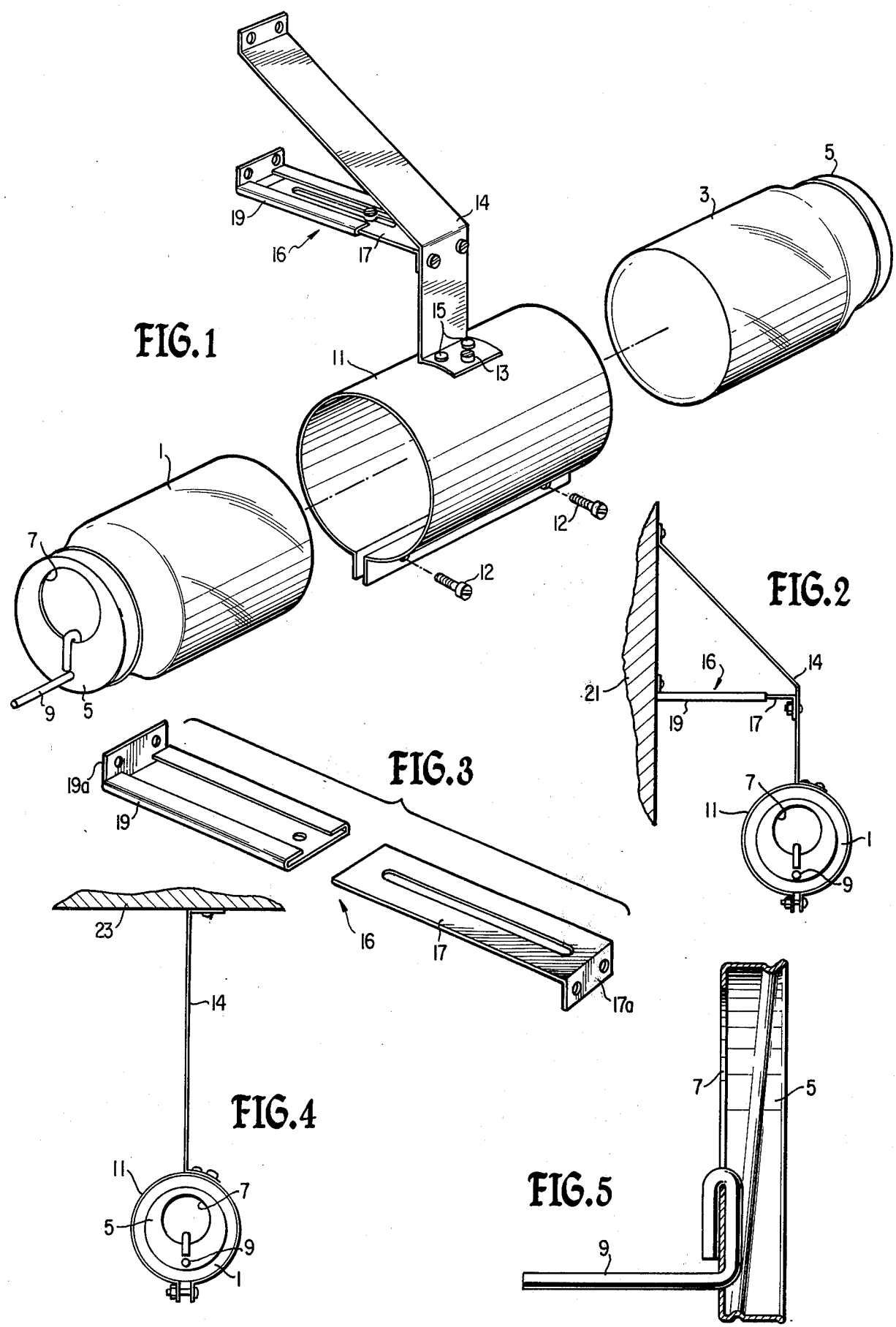

BIRD FEEDER

BACKGROUND OF THE INVENTION

The invention relates to a birdfeeder.

It is desirable that a birdfeeder be protected from squirrels and other animals which may disturb the feeder or its contents. Previous feeders have required mounting from lines or poles to prevent disturbance.

It is therefore an object of this invention to provide a birdfeeder, protected from squirrels and the like, which does not require long lines or poles.

It is also desirable that small birds may feed without disturbance from larger birds. At the same time, it is desirable that larger birds will not be prevented from feeding.

It is another object of this invention to provide a birdfeeder which allows both large and small birds to feed without the large birds chasing the small birds from the feeder.

It is therefore another object to provide a birdfeeder which is easily constructed from readily available materials.

Still another object is to provide a birdfeeder which may be folded into a compact package.

SUMMARY OF THE INVENTION

In accordance with principles of this invention, the objects as set forth are attained by providing a feed container having an orifice of a size which permits small birds to enter the container and feed, but prevents larger birds from entering. Larger birds may feed through the orifice while standing on a perch which is provided. The container is suspended by a strap from any permanent structure, for example, from a wall or tree limb, the strap being of a material down which squirrels and the like are unable to climb.

BRIEF DESCRIPTION OF THE DRAWINGS

The foregoing and other objects, features, and advantages of this invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

IN THE DRAWINGS:

FIG. 1 is a partially exploded perspective view of a preferred embodiment of a birdfeeder according to the invention.

FIG. 2 is a side view illustrating a means of suspending the feeder illustrated in FIG. 1.

FIG. 3 is a perspective view of a brace member suitable for use with the suspension means of FIG. 2.

FIG. 4 is a side view illustrating an alternate means for suspending the birdfeeder illustrated in FIG. 1.

FIG. 5 is a partially sectional view of a perch attached to a cap.

DESCRIPTION OF A PREFERRED EMBODIMENT

Referring to elements of the invention as embodied in the drawings, numerals 1 and 3 in FIG. 1 represent first and second birdfeed containers which can be glass jars, as shown. Each of the illustrated feed containers includes a screw-on cap 5 having an orifice 7 and supporting a perch 9. The orifice 7 is of a size which permits small birds to enter container 1 and feed. Birds which are too large to step through the orifice 7 may stand on perch 9 and feed through orifice 7. By properly choosing the orifice diameter both large and small birds may feed from the feeder because small birds feeding inside the container are not chased off by larger birds which are not able to enter the container. One and one-half inches has been found to be a suitable orifice diameter for chicadees, sparrows, finches or thrushes. Other diameters may be used to allow birds of predetermined sizes to enter the bird feed container and to prevent birds larger than the predetermined sizes from entering. In a preferred embodiment perch 9 was of one-quarter inch solid aluminum having a bend so as to be supported by cap 5 as shown in FIG. 5.

In the above regard it has been found that standard quart jars are admirably suited for containers 1 and 3, and standard lids such as those used on mayonnaise jars or the like are well suited for the caps 5. Accordingly it is only necessary to package modified caps with the bird feeder. The standard quart jars may be excluded in packaging and be provided by the ultimate consumer. Thus, the illustrated bird feeder provides an ecological benefit by providing a secondary use for glass jars.

First and second feed containers 1 and 3 are supported in a first support which, in the preferred embodiment, is a cylindrical sheet metal casing 11. As illustrated, one bird feed container may be placed in either end of casing 11; alternatively, one jar may be centered in the casing. Casing 11 includes bolts 12 to clamp the containers 1 and 3 snugly within the casing.

In suspending the support casing 11 in a manner to be disclosed, it is best that feed containers 1 and 3 be as nearly balanced as possible. A stop member protruding inside of the casing 11 at its center provides an easy means of centering, and thus balancing, containers 1 and 3. However, if only one bird feed container is to be supported in casing 11, the center stop member may be removed. Accordingly, stop screw 13 protrudes into the interior of metal casing 11 to align feed containers 1 and 3. Alternately, stop screw 13 may be removed and only one feed container may be supported in casing 11.

The illustrated embodiment's casing 11 is suspended by a strap 14. Strap 14 should be of a hard, smooth material such as sheet metal down which squirrels and the like cannot climb.

Preferably, strap 14 is attached to casing 11 by rivets 15, having large heads on both ends of the rivets. It has been found that a spot weld will rust and weaken when exposed to the elements and is thus not best suited in this application. And a pop rivet is not of sufficient strength because its head and base are generally not set well enough.

As shown in FIGS. 1 and 2, strap 14 is mounted to a second support wall 21 and the casing 11 is held away from the wall by a brace 16. To allow for ease in packaging, brace 16 is telescopic, comprising parts 17 and 19 as shown in FIG. 3. Part 19 is preferably formed of sheet metal having opposite edges turned in to form a slot through which part 17 may slide. Part 17 may either be of a heavier strip of metal as shown, or of sheet metal with opposite edges turned in for strength as the edges of part 17 are turned in. When part 17 is slid into part 19, the two parts may be held in an extended position by a bolt or the like placed through both parts. Ends 17a and 19a of parts 17 and 19 are bent as shown to provide surfaces for affixing parts 19 and 17 to the second support and the strap, respectively. Alternately, strap 14 may be attached to a horizontal member 23, such as a tree limb for example, as shown in FIG. 4. As noted above, squirrels and other animals cannot climb down strap 14 and, therefore, cannot disturb the feeder, nor can they eat the strap as has been found to be the case with certain types of plastic.

From the above description it can be seen that the bird feeder disclosed is constructed of readily available materials: glass jars, sheet metal, and the like.

In packaging, the telescopic brace 16 is removed and collapsed, and the strap 14 is wrapped around the casing 11. As noted above, feed container jars 1 and 3 need not be included in the package as they are readily available to the consumer. Therefore, in an alternate manner of packaging, the bolts 12 are released and support casing 11 is unrolled to allow for a flat package.

It should be further noted that many towns have ordinances which require that feed from a bird feeder not be open to rats and other vermin and that the feed will be unlikely to fall out of the container to attract these vermin. The bird feeder disclosed complies with those ordinances. Vermin are unable to reach the feed containers 1 and 3 because they are suspended away from other objects by a hard, smooth strap. Also, because the containers are substantially closed having only small holes 7, feed does not readily fall out of the containers.

While the invention has been particularly shown and described with reference to preferred embodiments thereof, it will be understood by those skilled in the art that various changes in form and details may be made therein without departing from the spirit and scope of the invention.

I claim:

1. A bird feeder of the type in which at least one bird feed container is mounted to a first support and said first support is suspended by a vertical hanging means from a second support, said bird feeder being constructed such that:

said first support is freely aerially suspended by said hanging means away from surrounding objects and away from said second support, so that undesirable animals are inhibited from reaching said first support and said bird feed container;

said bird feed container being a substantially closed container having an opening through which birds are able to feed;

said first support being a cylinder adapted for at least partially enclosing said container, said cylinder being formed from a substantially rectangular sheet of flexible material and fasteners, opposite sides of said sheet being connected by said fasteners to shape said sheet into said cylinder so that said container is insertable in either end of said cylinder;

said fasteners being operative to draw opposite sides of said sheet closer to each other to reduce the diameter of said cylinder and thereby clamp said container into said cylinder, thereby permitting the use of various sized containers;

said bird feeder further comprising a stop member, said stop member protruding inside of said cylinder at substantially the longitudinal center thereof, thereby serving as a locating means for two of said containers inserted into either end of said cylinder.

2. The bird feeder of claim 1 wherein said stop member is a screw.

* * * * *